United States Patent
Jain et al.

(10) Patent No.: US 11,915,002 B2
(45) Date of Patent: Feb. 27, 2024

(54) PROVIDING EXTENDED BRANCH TARGET BUFFER (BTB) ENTRIES FOR STORING TRUNK BRANCH METADATA AND LEAF BRANCH METADATA

(71) Applicant: Microsoft Technology Licensing, LLC, Redmond, WA (US)

(72) Inventors: Saransh Jain, Raleigh, NC (US); Rami Mohammad Al Sheikh, Morrisville, NC (US); Daren Eugene Streett, Cary, NC (US); Michael Scott McIlvaine, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/808,916

(22) Filed: Jun. 24, 2022

(65) Prior Publication Data

US 2023/0418615 A1 Dec. 28, 2023

(51) Int. Cl.
*G06F 9/38* (2018.01)

(52) U.S. Cl.
CPC .......... *G06F 9/3806* (2013.01); *G06F 9/3867* (2013.01)

(58) Field of Classification Search
CPC .................................................... G06F 9/3806
See application file for complete search history.

(56) References Cited

U.S. PATENT DOCUMENTS

| | | | |
|---|---|---|---|
| 6,247,097 B1 | 6/2001 | Sinharoy | |
| 2006/0218385 A1* | 9/2006 | Smith | G06F 9/3848 |
| | | | 712/E9.056 |
| 2018/0060073 A1* | 3/2018 | Havlir | G06F 9/3806 |
| 2019/0369999 A1* | 12/2019 | Evers | G06F 9/3844 |
| 2021/0373896 A1* | 12/2021 | Clouqueur | G06F 9/3836 |

FOREIGN PATENT DOCUMENTS

WO 2021108007 A1 6/2021

OTHER PUBLICATIONS

"International Search Report and Written Opinion Issued in PCT Application No. PCT/US23/021621", dated Sep. 4, 2023, 11 Pages.

* cited by examiner

*Primary Examiner* — Courtney P Carmichael-Moody
(74) *Attorney, Agent, or Firm* — Withrow & Terranova, PLLC

(57) ABSTRACT

Providing extended branch target buffer (BTB) entries for storing trunk branch metadata and leaf branch metadata is disclosed herein. In one aspect, a processor comprises a BTB circuit comprising a BTB comprising a plurality of extended BTB entries. The BTB circuit is configured to store trunk branch metadata for a first branch instruction in an extended BTB entry of the plurality of extended BTB entries, wherein the extended BTB entry corresponds to a first aligned memory block containing an address of the first branch instruction. The BTB circuit is also configured to store leaf branch metadata for a second branch instruction in the extended BTB entry in association with the trunk branch metadata, wherein an address of the second branch instruction is subsequent to a target address of the first branch instruction within a second aligned memory block.

16 Claims, 10 Drawing Sheets

PROVIDING EXTENDED BRANCH TARGET BUFFER (BTB) ENTRIES FOR STORING TRUNK BRANCH METADATA AND LEAF BRANCH METADATA

FIELD OF THE DISCLOSURE

The technology of this disclosure relates to processing of instructions for execution in a microprocessor ("processor"), and, in particular, to branch prediction of branch instructions in a processor.

BACKGROUND

Conventional processors may employ a processing technique known as instruction pipelining, whereby the throughput of computer instructions being executed may be increased by dividing the processing of each instruction into a series of steps which are then executed within an execution pipeline composed of multiple stages. Optimal processor performance may be achieved if all stages in an execution pipeline are able to process instructions concurrently and sequentially as the instructions are ordered in the execution pipeline. However, circumstances referred to as structural hazards may arise, whereby a next instruction cannot be executed without leading to incorrect computation results. For instance, a control hazard may occur as a result of execution of a branch instruction, which may redirect the path of instruction execution based on an outcome evaluated when the branch instruction is executed. When the branch instruction is encountered, the processor may need to stall the fetching of additional instructions until the branch instruction has executed, which may result in reduced processor performance and increased power consumption.

One approach for maximizing processor performance involves utilizing branch prediction to speculatively predict the path to be taken by a branch instruction (based on, e.g., the results of previously executed branch instructions), and basing the fetching of subsequent instructions on the branch prediction. When the branch instruction reaches the execution stage of the instruction pipeline and is executed, the resultant target address of the branch instruction is verified by comparing it with the previously predicted target address when the branch instruction was fetched. If the predicted and actual target addresses match (i.e., the branch prediction was correct), instruction execution can proceed without delay because the subsequent instructions at the target address will have already been fetched and will be present in the instruction pipeline.

Conventional branch prediction mechanisms may include both a branch predictor circuit and a branch target buffer (BTB). The branch predictor circuit is responsible for predicting branch behavior by, e.g., predicting whether or not a branch instruction will be taken (in the case of conditional branch predictors) and/or by predicting a target address of a branch instruction (in the case of indirect branch predictors). The BTB is a cache that includes BTB entries that each store branch metadata for branch instructions within a specific memory block starting at an aligned address (e.g., cacheline aligned). The branch metadata may include, as non-limiting examples, a branch offset indicating a position of the branch instruction relative to the aligned address, a type of branch instruction (e.g., conditional, call, indirect, and the like), and a target address of the branch instruction.

During the process of fetching instructions, the processor uses a fetch address of an instruction to access both the BTB and the branch predictor circuit. Branch metadata (if any) for the instruction in the BTB is combined with output from the branch predictor circuit to generate a fetch bundle, which specifies a start fetch address, a number of instructions to fetch, and a next fetch address. If a predicted-taken branch instruction among the instructions to be fetched has a target address in a different aligned memory block than the branch instruction, the processor would need to consume another processor cycle to perform an additional access to the BTB to retrieve metadata for any branch instructions in the different aligned memory block. Such an additional access to the BTB would consume additional processor resources and negatively impact processor performance. Instead, the fetch bundle is terminated at the predicted-taken branch instruction, regardless of whether the branch predictor has available capacity to perform additional branch predictions during the same processor cycle. As a consequence, front-end instruction pipeline throughput may be limited.

SUMMARY

Aspects disclosed herein include providing extended branch target buffer (BTB) entries for storing trunk branch metadata and leaf branch metadata. As used herein, "trunk branch metadata" refers to branch metadata for a first branch instruction (i.e., the "trunk branch instruction") within a first aligned memory block that corresponds to an extended BTB entry in a BTB, while "leaf branch metadata" refers to branch metadata for a second branch instruction (i.e., the "leaf branch instruction") within a second aligned memory block containing a target address of the trunk branch instruction, where the address of the second branch instruction is subsequent to the target address of the trunk branch instruction. In aspects disclosed herein, a processor comprises a BTB circuit that provides a BTB that includes a plurality of extended BTB entries. By storing both trunk branch metadata and corresponding leaf branch metadata within a single extended BTB entry, the BTB circuit enables more efficient use of branch prediction hardware in circumstances in which a trunk branch instruction is predicted to be taken. For instance, in some aspects, when a trunk branch instruction is predicted to be taken by a branch predictor circuit, leaf branch metadata may be retrieved by the BTB circuit from the extended BTB entry for the trunk branch instruction, and used by the branch predictor circuit to generate a branch prediction for the leaf branch instruction within a same processor cycle.

Some aspects may provide that the BTB circuit provides hardware-efficient extended BTB entries that comprise a plurality of branch entries that each can be allocated to store either trunk branch metadata or leaf branch metadata. The extended BTB entries in such aspects store trunk branch metadata in conventional fashion, and can also store leaf branch metadata in unused branch entries if the extended BTB entry contains more branch entries than the number of trunk branch instructions within the aligned memory block corresponding to the extended BTB entry. Thus, for example, if the extended BTB entry comprises four (4) branch entries but the corresponding aligned memory block only contains two (2) trunk branch instructions, the remaining two (2) unused branch entries may be allocated to store leaf branch metadata. When leaf branch metadata for a leaf branch instruction is stored in a branch entry of the extended BTB entry, the trunk metadata for the corresponding trunk branch instruction is updated to store an index of the branch entry as a leaf branch index.

Some such aspects may provide that branch entries for storing trunk branch metadata are allocated "left-to-right"

within the extended BTB entry, while branch entries for storing leaf branch metadata are allocated "right-to-left" within the extended BTB entry. This may be accomplished by the BTB circuit allocating an available branch entry having a lowest index to store trunk branch metadata, and allocating an available branch entry having a highest index to store leaf branch metadata. For instance, if an extended BTB entry contains four (4) branch entries indexed 1 to 4, and the first branch entry at index 1 is already allocated, the BTB circuit may next allocate the branch entry at index 2 to store trunk branch metadata, while the BTB circuit may next allocate the branch entry at index 4 to store leaf branch metadata.

According to some aspects, if trunk branch metadata needs to be stored but all branch entries within an extended BTB have been previously allocated, the BTB circuit may reallocate a branch entry storing leaf branch metadata to store the trunk branch metadata (i.e., trunk branch metadata is prioritized for allocation over leaf branch metadata). Similarly, if leaf branch metadata needs to be stored but all branch entries within the extended BTB have been previously allocated, the BTB circuit may reallocate a branch entry storing preexisting leaf branch metadata (but not one storing trunk branch metadata) to store the leaf branch metadata. If a branch entry is reallocated and preexisting leaf branch metadata is overwritten in this manner, any trunk branch metadata associated with the preexisting leaf branch metadata within the extended BTB entry is updated to clear the leaf branch index of the trunk branch metadata. In some aspects, a merit counter may be associated with each of the branch entries of the extended BTB entry. The BTB circuit may increment a merit counter each time a corresponding branch entry is accessed, and subsequently may use the merit counters to select an appropriate branch entry to reallocate if the extended BTB entry is fully occupied. For example, a branch entry that is associated with a merit counter having a lowest value may be selected to be reallocated, or a branch entry that is among one or more branch entries that each are associated with a merit counter having a value below a merit threshold may be selected to be reallocated.

Some aspects may provide higher-performance extended BTB entries that comprise a plurality of branch entries that are each configured to store both trunk branch metadata and leaf branch metadata for one or more leaf branch instructions. In such aspects, all leaf branch metadata for each trunk branch instruction can be stored and accessed if the trunk branch instruction is predicted to be taken. However, such aspects require a larger BTB than the hardware-efficient variant discussed above.

In this regard, in one exemplary aspect, a processor for providing extended BTB entries for storing trunk branch metadata and leaf branch metadata is disclosed. The processor comprises an instruction processing circuit configured to process an instruction stream comprising a plurality of instructions in an instruction pipeline, and a BTB circuit comprising a BTB comprising a plurality of extended BTB entries. The BTB circuit is configured to store trunk branch metadata for a first branch instruction among the plurality of instructions in an extended BTB entry of the plurality of extended BTB entries, wherein the extended BTB entry corresponds to a first aligned memory block containing an address of the first branch instruction. The BTB circuit is further configured to store leaf branch metadata for a second branch instruction among the plurality of instructions in the extended BTB entry in association with the trunk branch metadata, wherein an address of the second branch instruction is subsequent to a target address of the first branch instruction within a second aligned memory block.

In another exemplary aspect, a method for providing extended BTB entries for storing trunk branch metadata and leaf branch metadata is disclosed. The method comprises storing, by a BTB circuit of a processor, trunk branch metadata for a first branch instruction among a plurality of instructions in an instruction stream in an extended BTB entry of a plurality of extended BTB entries of a BTB, wherein the extended BTB entry corresponds to a first aligned memory block containing an address of the first branch instruction. The method further comprises storing, by the BTB circuit, leaf branch metadata for a second branch instruction among the plurality of instructions in the extended BTB entry in association with the trunk branch metadata, wherein an address of the second branch instruction is subsequent to a target address of the first branch instruction within a second aligned memory block.

In another exemplary aspect, a non-transitory computer-readable medium for providing extended BTB entries for storing trunk branch metadata and leaf branch metadata is disclosed. The non-transitory computer-readable medium stores computer-executable instructions that, when executed, cause a processor to store trunk branch metadata for a first branch instruction among a plurality of instructions in an instruction stream in an extended BTB entry of a plurality of extended BTB entries of a BTB, wherein the extended BTB entry corresponds to a first aligned memory block containing an address of the first branch instruction. The computer-executable instructions further cause the processor to store leaf branch metadata for a second branch instruction among the plurality of instructions in the extended BTB entry in association with the trunk branch metadata, wherein an address of the second branch instruction is subsequent to a target address of the first branch instruction within a second aligned memory block.

Those skilled in the art will appreciate the scope of the present disclosure and realize additional aspects thereof after reading the following detailed description of the preferred aspects in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
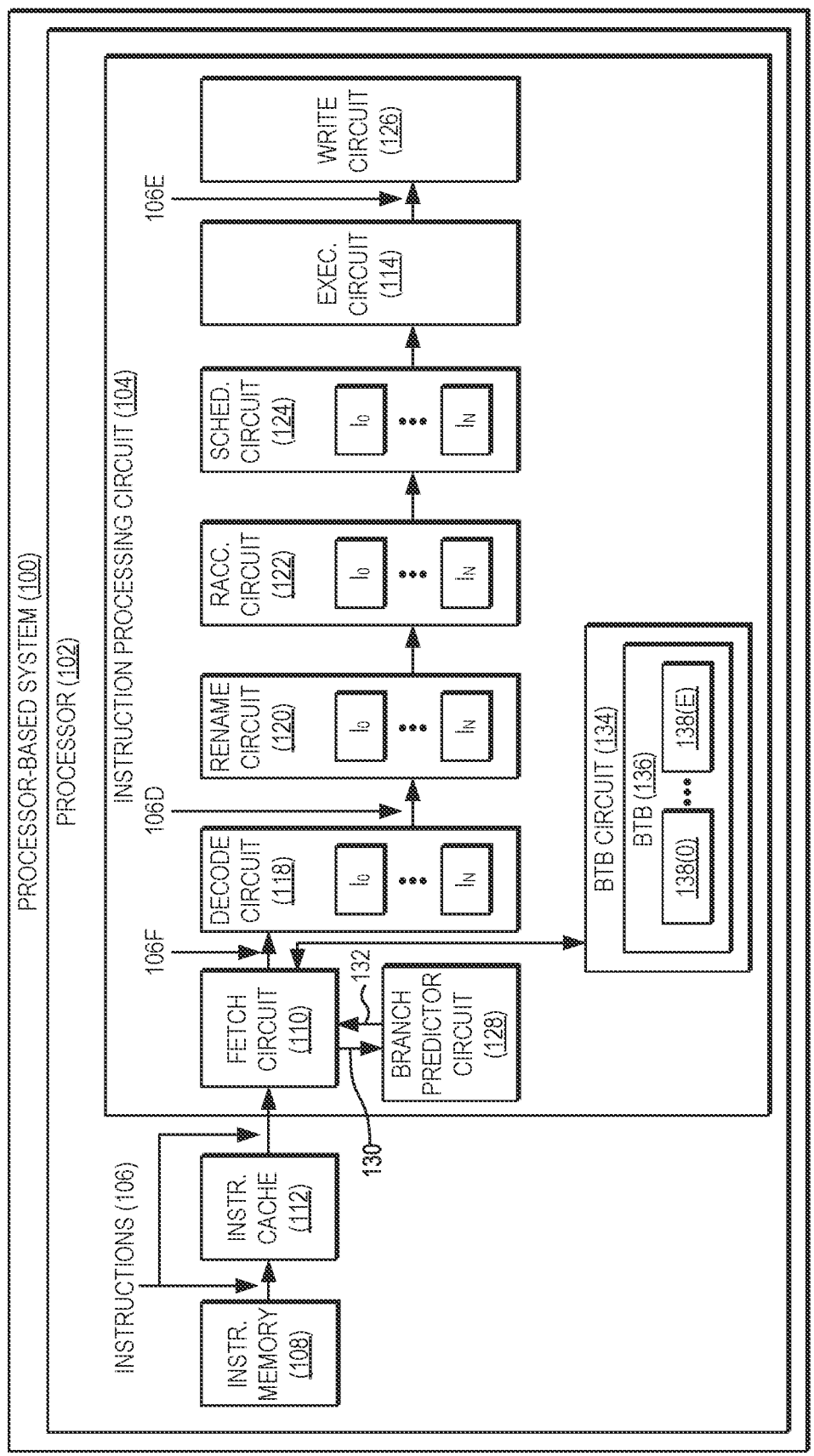
FIG. 1 is a diagram of an exemplary processor-based system that includes a processor with an instruction processing circuit that includes a branch target buffer (BTB) circuit that provides extended BTB entries for storing trunk branch metadata and leaf branch metadata.
Figure 4:
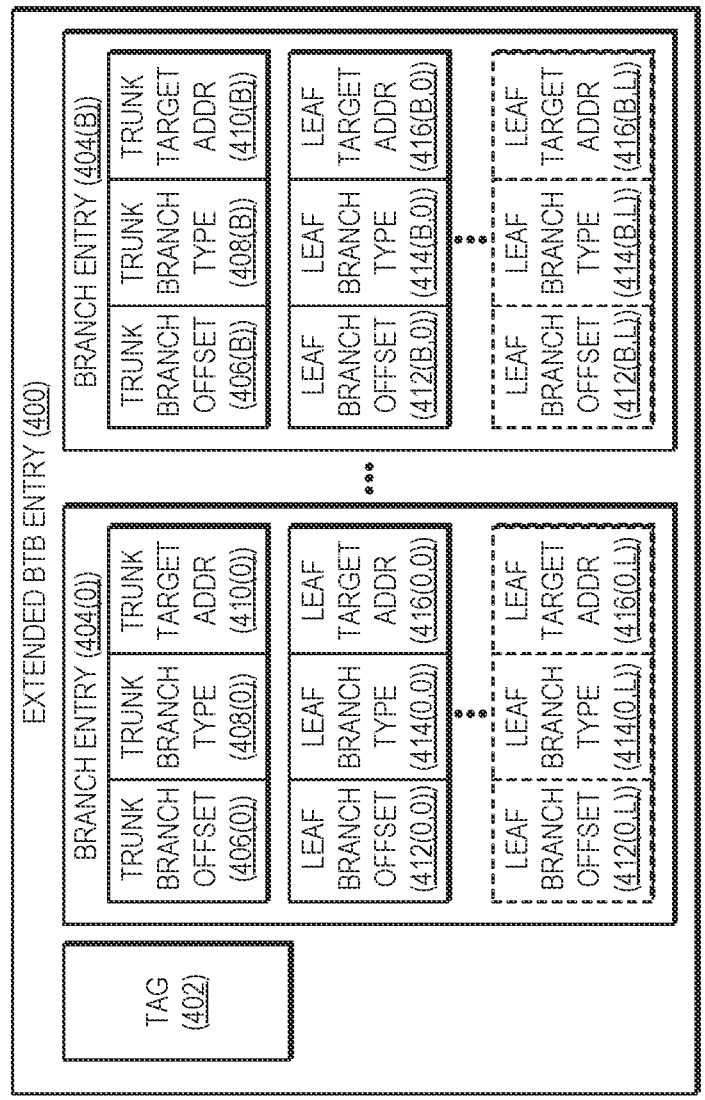
FIG. 4 illustrates an exemplary high-performance extended BTB entry, according to some aspects.
Figure 7:
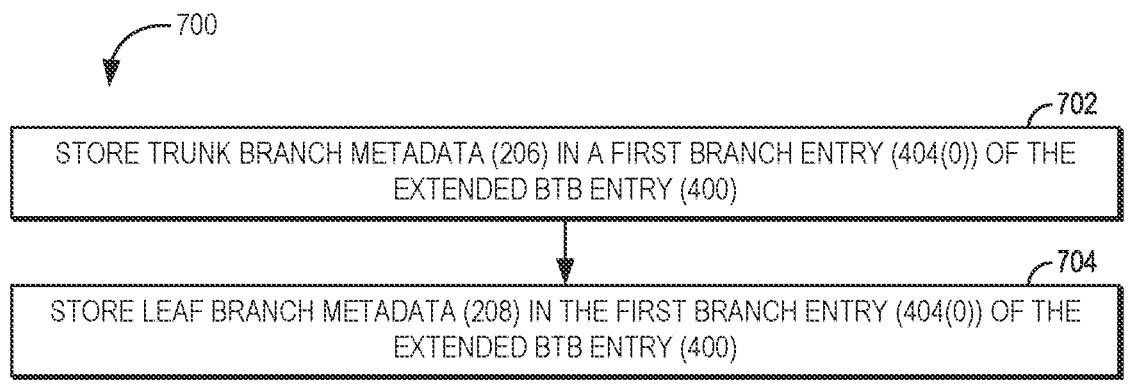
Figure 8:
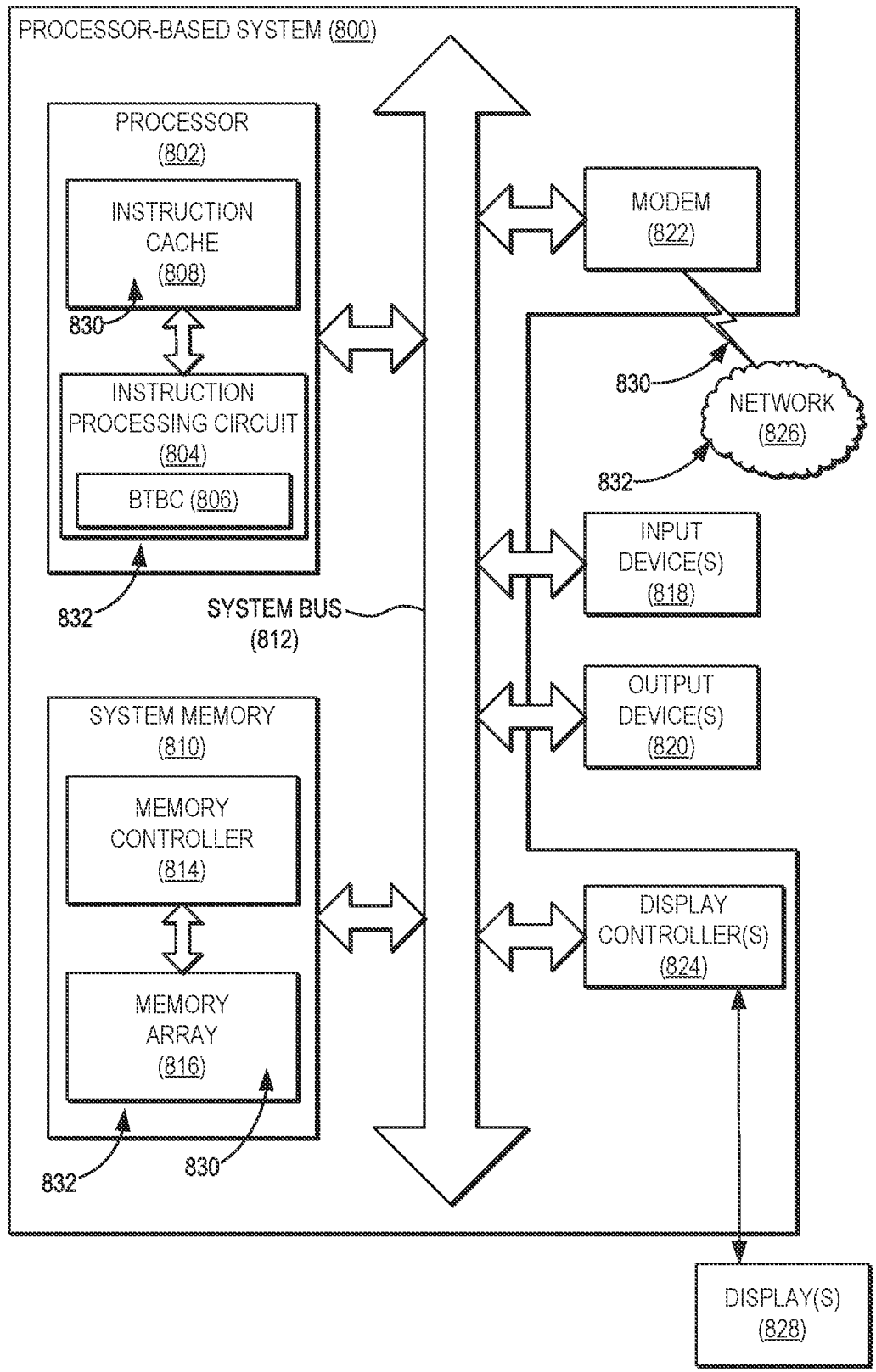

FIG. 7 is a flowchart illustrating exemplary operations for allocating branch entries in the high-performance extended BTB entry of FIG. 4 according to some aspects; and FIG. 8 is a block diagram of an exemplary processor-based system that includes a processor with an instruction processing circuit, such as the instruction processing circuit of FIG. 1 that includes a BTB circuit for providing extended BTB entries for storing trunk branch metadata and leaf branch metadata.

DETAILED DESCRIPTION

Aspects disclosed herein include providing extended branch target buffer (BTB) entries for storing trunk branch metadata and leaf branch metadata. As used herein, "trunk branch metadata" refers to branch metadata for a first branch instruction (i.e., the "trunk branch instruction") within a first aligned memory block that corresponds to an extended BTB entry in a BTB, while "leaf branch metadata" refers to branch metadata for a second branch instruction (i.e., the "leaf branch instruction") within a second aligned memory block containing a target address of the trunk branch instruction, where the address of the second branch instruction is subsequent to the target address of the trunk branch instruction. In aspects disclosed herein, a processor comprises a BTB circuit that provides a BTB that includes a plurality of extended BTB entries. By storing both trunk branch metadata and corresponding leaf branch metadata within a single extended BTB entry, the BTB circuit enables more efficient use of branch prediction hardware in circumstances in which a trunk branch instruction is predicted to be taken. For instance, in some aspects, when a trunk branch instruction is predicted to be taken by a branch predictor circuit, leaf branch metadata may be retrieved by the BTB circuit from the extended BTB entry for the trunk branch instruction, and used by the branch predictor circuit to generate a branch prediction for the leaf branch instruction within a same processor cycle.

Some aspects may provide that the BTB circuit provides hardware-efficient extended BTB entries that comprise a plurality of branch entries that each can be allocated to store either trunk branch metadata or leaf branch metadata. The extended BTB entries in such aspects store trunk branch metadata in conventional fashion, and can also store leaf branch metadata in unused branch entries if the extended BTB entry contains more branch entries than the number of trunk branch instructions within the aligned memory block corresponding to the extended BTB entry. Thus, for example, if the extended BTB entry comprises four (4) branch entries but the corresponding aligned memory block only contains two (2) trunk branch instructions, the remaining two (2) unused branch entries may be allocated to store leaf branch metadata. When leaf branch metadata for a leaf branch instruction is stored in a branch entry of the extended BTB entry, the trunk metadata for the corresponding trunk branch instruction is updated to store an index of the branch entry as a leaf branch index.

Some such aspects may provide that branch entries for storing trunk branch metadata are allocated "left-to-right" within the extended BTB entry, while branch entries for storing leaf branch metadata are allocated "right-to-left" within the extended BTB entry. This may be accomplished by the BTB circuit allocating an available branch entry having a lowest index to store trunk branch metadata, and allocating an available branch entry having a highest index to store leaf branch metadata. For instance, if an extended BTB entry contains four (4) branch entries indexed 1 to 4, and the first branch entry at index 1 is already allocated, the BTB circuit may next allocate the branch entry at index 2 to store trunk branch metadata, while the BTB circuit may next allocate the branch entry at index 4 to store leaf branch metadata.

According to some aspects, if trunk branch metadata needs to be stored but all branch entries within an extended BTB have been previously allocated, the BTB circuit may reallocate a branch entry storing leaf branch metadata to store the trunk branch metadata (i.e., trunk branch metadata is prioritized for allocation over leaf branch metadata). Similarly, if leaf branch metadata needs to be stored but all branch entries within the extended BTB have been previously allocated, the BTB circuit may reallocate a branch entry storing preexisting leaf branch metadata (but not one storing trunk branch metadata) to store the leaf branch metadata. If preexisting leaf branch metadata is overwritten in this manner, any trunk branch metadata associated with the preexisting leaf branch metadata within the extended BTB entry is updated to clear the leaf branch index of the trunk branch metadata. In some aspects, a merit counter may be associated with each of the branch entries of the extended BTB entry. The BTB circuit may increment a merit counter each time a corresponding branch entry is accessed, and subsequently may use the merit counters to select an appropriate branch entry to reallocate if the extended BTB entry is fully occupied. For example, a branch entry that is associated with a merit counter having a lowest value may be selected to be reallocated, or a branch entry that is among one or more branch entries that each are associated with a merit counter having a value below a merit threshold may be selected to be reallocated.

Some aspects may provide higher-performance extended BTB entries that comprise a plurality of branch entries that are each configured to store both trunk branch metadata and leaf branch metadata for one or more leaf branch instructions. In such aspects, all leaf branch metadata for each trunk branch instruction can be stored and accessed if the trunk branch instruction is predicted to be taken. However, such aspects require a larger BTB than the hardware-efficient variant discussed above.

In this regard, FIG. 1 is a diagram of an exemplary processor-based system 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based system 100. In the example of FIG. 1, the processor 102 includes an instruction processing circuit 104 that includes one or more instruction pipelines $I_0$-$I_N$ for processing instructions 106 fetched from an instruction memory (captioned "INSTR. MEMORY" in FIG. 1) 108 by a fetch circuit 110 for execution. The instruction memory 108 may be provided in or as part of a system memory in the processor-based system 100, as a non-limiting example. An instruction cache (captioned "INSTR. CACHE" in FIG. 1) 112 may also be provided in the processor 102 to cache the instructions 106 fetched from the instruction memory 108 to reduce latency in the fetch circuit 110.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned "EXEC. CIRCUIT" in FIG. 1) 114 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 118 configured to decode the fetched instructions 106F fetched by the fetch circuit 110 into decoded instructions 106D to determine the instruction type and actions required. The instruction type and action required encoded in the decoded instruction 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 120 in the instruction processing circuit 104. The rename circuit 120 is configured to determine if any register names in the decoded instructions 106D should be renamed to decouple any register dependencies that would prevent parallel or out-of-order processing.

The instruction processing circuit 104 in the processor 102 in FIG. 1 also includes a register access circuit (captioned "RACC. CIRCUIT" in FIG. 1) 122. The register access circuit 122 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 122 is also configured to provide the retrieved produced value from an executed instruction 106E as the source register operand of a decoded instruction 106D to be executed.

Also, in the instruction processing circuit 104, a scheduler circuit (captioned "SCHED CIRCUIT" in FIG. 1) 124 is provided in the instruction pipeline $I_0$-$I_N$ and is configured to store decoded instructions 106D in reservation entries until all source register operands for the decoded instruction 106D are available. The scheduler circuit 124 issues decoded instructions 106D that are ready to be executed to the execution circuit 114. A write circuit 126 is also provided in the instruction processing circuit 104 to write back or commit produced values from executed instructions 106E to memory (such as the PRF), cache memory, or system memory.

With continuing reference to FIG. 1, the instruction processing circuit 104 also includes a branch predictor circuit 128. The branch predictor circuit 128 is configured to speculatively predict the outcome of a fetched branch instruction that controls whether instructions corresponding to a taken path or a not-taken path in the instruction control flow path are fetched into the instruction pipelines $I_0$-$I_N$ for execution. For example, the fetched branch instruction may be a branch instruction 130 that includes a condition to be resolved by the instruction processing circuit 104 to determine which instruction control flow path should be taken. In this manner, the outcome of the branch instruction 130 in this example does not have to be resolved in execution by the execution circuit 114 before the instruction processing circuit 104 can continue processing fetched instructions 106F. The prediction made by the branch predictor circuit 128 can be provided as a branch prediction 132 to the fetch circuit 110 to be used to determine the next instructions 106 to fetch as the fetched instructions 106F.

The instruction processing circuit 104 of FIG. 1 also provides a BTB circuit 134 to cache additional metadata for use in conjunction with the branch predictor circuit 128 when determining a next fetch address. The BTB circuit 134 includes a BTB 136 that comprises a plurality of entries, each of which corresponds to an aligned memory block from which instructions are fetched, and each of which stores branch metadata relating to branch instructions within that aligned memory block. The branch metadata may include, as non-limiting examples, a branch offset indicating a position of the branch instruction relative to the address of the aligned memory block, a type of branch instruction (e.g., conditional, call, indirect, and the like), and a target address of the branch instruction. During the process of fetching instructions, the processor 102 uses a fetch address of an instruction to access both the BTB circuit 134 and the branch predictor circuit 128 and generate a fetch bundle (not shown). It is to be understood that, while the BTB circuit 134 and the BTB 136 are illustrated in FIG. 1 as a single element, some aspects may provide that the BTB circuit 134 and the BTB 136 are implemented as separate elements. Further, it is to be understood that, while the branch predictor circuit 128 and the BTB circuit 134 are illustrated as separate elements in FIG. 1, in some aspects the BTB circuit 134 may be integrated into the branch predictor circuit 128.

As noted above, when the target address of a predicted-taken branch instruction is in a different aligned memory block than the branch instruction, the processor 102 would need to consume another processor cycle to perform an additional access to the BTB 136 to retrieve metadata for any branch instructions in the different aligned memory block, which would negatively impact processor performance. Consequently, the fetch bundle may be terminated at the predicted-taken branch instruction even if the branch predictor has available capacity to perform additional branch predictions during the same processor cycle.

Figure 2:
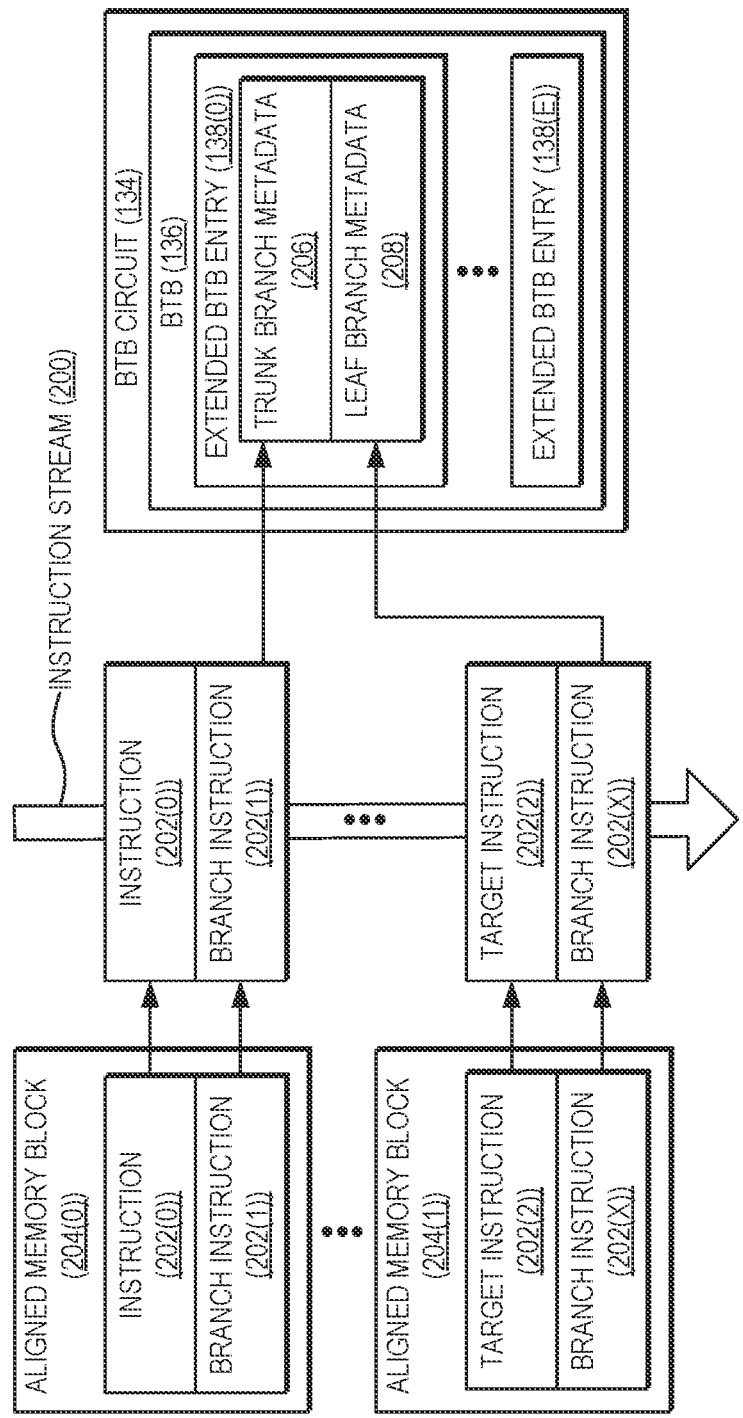
FIG. 2 illustrates exemplary functionality of the BTB circuit and the extended BTB entries of FIG. 1 in greater detail.

In this regard, the BTB 136 of FIG. 1 provides extended BTB entries 138(0)-138(E) for storing trunk branch metadata (branch metadata for a first branch instruction within a first aligned memory block that corresponds to an extended BTB entry) and leaf branch metadata (branch metadata for a second branch instruction within a second aligned memory block that contains a target address of the first branch instruction, where the address of the second branch instruction is subsequent to the target address of the trunk branch instruction). To illustrate exemplary functionality of the BTB circuit 134 and the extended BTB entries 138(0)-138(E) of FIG. 1 for storing trunk branch metadata and leaf branch metadata, FIG. 2 is provided. As seen in FIG. 2, an instruction stream 200 comprising a plurality of instructions 202(0)-202(X) is being executed (e.g., by the instruction processing circuit 104 of FIG. 1). The plurality of instructions 202(0)-202(X) include an instruction 202(0) and a branch instruction 202(1), both of which were fetched from an aligned memory block 204(0). The plurality of instructions 202(0)-202(X) also includes a target instruction 202(2) (i.e., an instruction located at a target address of the branch instruction 202(1)) and a branch instruction 202(X), both of which were fetched from an aligned memory block 204(1). Also shown in FIG. 2 are the BTB circuit 134 of FIG. 1, the BTB 136 of FIG. 1, and the extended BTB entries 138(0)-138(E) of FIG. 1. For purposes of illustration, it is assumed that the aligned memory block 204(0) of FIG. 2 corresponds to the extended BTB entry 138(0).

During a first execution of the plurality of instructions 202(0)-202(X), the instruction 202(0) and the branch instruction 202(1) are encountered and executed. After the branch instruction 202(1) is executed, the BTB circuit 134 stores trunk branch metadata 206 for the branch instruction 202(1) in the extended BTB entry 138(0) corresponding to the aligned memory block 204(0) from which the branch instruction 202(1) was fetched. Subsequently, as the target instruction 202(2) is encountered and executed in the instruction stream 200, the instruction processing circuit 104 of FIG. 1 tags or otherwise tracks the instructions fetched from the aligned memory block 204(1) as potential leaf instruction candidates. When the branch instruction 202(X) is executed, the BTB circuit 134 stores leaf branch metadata 208 for the branch instruction 202(X) in the extended BTB entry 138(0) in association with the trunk branch metadata 206. Exemplary implementations of the extended BTB entries 138(0)-138(E) are discussed in greater detail below with respect to FIGS. 3 and 4.

During later executions of the instruction stream 200, when the branch instruction 202(1) is encountered, the branch predictor circuit 128 of FIG. 1 may predict that the branch instruction 202(1) is taken. The BTB circuit 134 then identifies the extended BTB entry 138(0) as containing the trunk branch metadata 206 corresponding to the branch instruction 202(1), and retrieves the leaf branch metadata 208 corresponding to the branch instruction 202(X). Using the leaf branch metadata 208, the branch predictor circuit 128 is then able to predict, within a same processor cycle, the target of the branch instruction 202(X).

Figure 3:
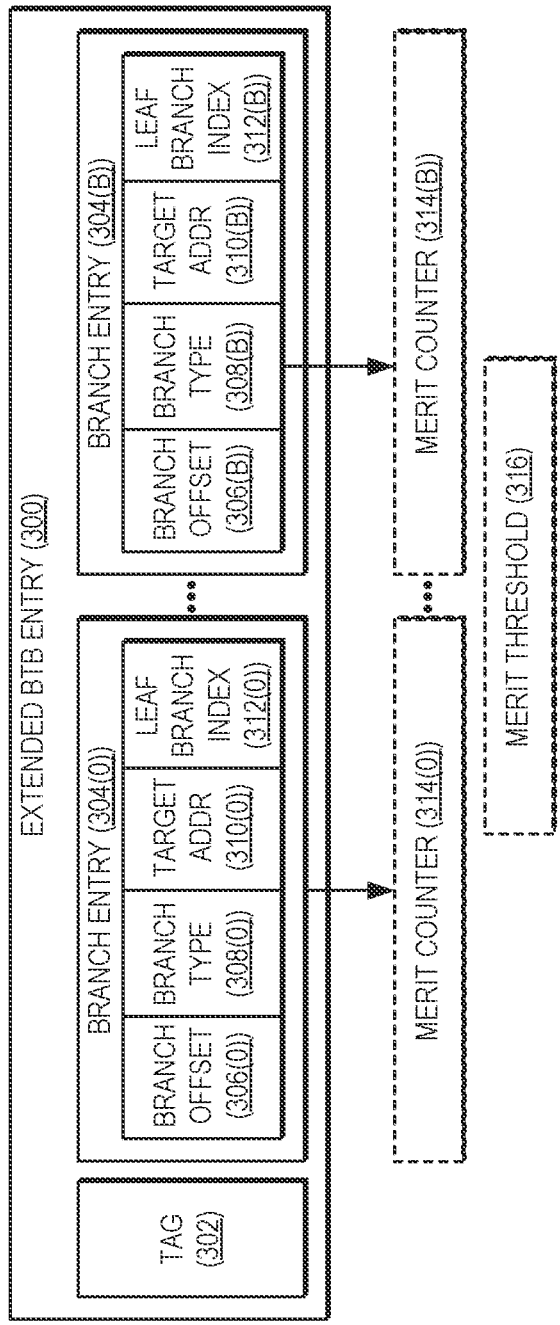
FIG. 3 illustrates an exemplary hardware-efficient extended BTB entry, according to some aspects.

To illustrate an exemplary hardware-efficient extended BTB entry according to some aspects, FIG. 3 is provided. FIG. 3 shows an extended BTB entry 300 that corresponds to each of the extended BTB entries 138(0)-138(E) of FIGS. 1 and 2 in some aspects. In the example of FIG. 3, the extended BTB entry 300 includes a tag 302 that identifies the extended BTB entry 300, and that may be generated based on an address of a corresponding aligned memory block such as the aligned memory blocks 204(0) and 204(1) of FIG. 2. The extended BTB entry 300 further comprises a plurality of branch entries 304(0)-304(B). Each of the branch entries 304(0)-304(B) corresponds to a branch instruction (i.e., a trunk branch instruction or a leaf branch instruction) and may be identified by an index.

The plurality of branch entries 304(0)-304(B) each stores branch metadata (i.e., trunk branch metadata or leaf branch metadata) for the corresponding branch instruction. As seen in FIG. 3, the metadata may include branch offsets 306(0)-306(B) that indicate an offset of each corresponding branch instruction from the address of the aligned memory block; branch types 308(0)-308(B) indicating a type of each corresponding branch instruction; target addresses (captioned as "TARGET ADDR" in FIG. 3) 310(0)-310(B) indicating a target address of each corresponding branch instruction; and, for branch entries 304(0)-304(B) that store trunk branch metadata, leaf branch indices 312(0)-312(B) that each indicate an index of a branch entry 304(0)-304(B) storing leaf branch metadata associated with the trunk branch metadata. It is to be understood that the metadata stored by the branch entries 304(0)-304(B) corresponds to the trunk branch metadata 206 and the leaf branch metadata 208 of FIG. 2 in some aspects.

The branch entries 304(0)-304(B) of FIG. 3 are configured to store trunk branch metadata in conventional fashion, and are also configured to store leaf branch metadata in unused branch entries if the extended BTB entry 300 contains more branch entries 304(0)-304(B) than the number of trunk branch instructions within the aligned memory block corresponding to the extended BTB entry 300. When leaf branch metadata for a leaf branch instruction is stored in a branch entry of the branch entries 304(0)-304(B) of the extended BTB entry 300, the leaf branch index 312(0)-312(B) of the trunk metadata for the corresponding trunk branch instruction is updated to store an index of the branch entry.

In some aspects, the BTB circuit 134 of FIGS. 1 and 2 may be configured to allocate the branch entries 304(0)-304(B) for storing trunk branch metadata "left-to-right" within the extended BTB entry 300, and further to allocate the branch entries 304(0)-304(B) for storing leaf branch metadata "right-to-left" within the extended BTB entry 300. Thus, for trunk branch metadata, the BTB circuit 134 may allocate an available one of the branch entries 304(0)-304(B) having a lowest index, and for leaf branch metadata, the BTB circuit 134 may allocate an available one of the branch entries 304(0)-304(B) having a highest index. In the example of FIG. 3, for instance, the BTB circuit 134 may allocate the branch entry 304(0) to store trunk branch metadata and may allocate the branch entry 304(B) to store leaf branch metadata.

Some aspects may provide that, if trunk branch metadata needs to be stored but all of the branch entries 304(0)-304(B) have been previously allocated, the BTB circuit 134 may reallocate one of the branch entries 304(0)-304(B) storing leaf branch metadata to store the trunk branch metadata (i.e., trunk branch metadata is prioritized for allocation over leaf branch metadata). Similarly, if leaf branch metadata needs to be stored but all of the branch entries 304(0)-304(B) have been previously allocated, the BTB circuit 134 may reallocate one of the branch entries 304(0)-304(B) storing preexisting leaf branch metadata (but not one storing trunk branch metadata) to store the leaf branch metadata. Any trunk branch metadata within the extended BTB entry 300 that is associated with the overwritten preexisting leaf branch metadata is updated to clear the leaf branch index 312(0)-312(B) of the trunk branch metadata.

According to some aspects, a plurality of merit counters 314(0)-314(B) may be associated with each of the branch entries 304(0)-304(B) of the extended BTB entry 300 to enable more intelligent selection of branch entries 304(0)-304(B) for reallocation. In some aspects, the BTB circuit 134 may increment each of the merit counters 314(0)-314(B) each time the corresponding branch entry 304(0)-304(B) is accessed, and subsequently may use the merit counters 314(0)-314(B) to select the most appropriate one of the branch entries 304(0)-304(B) to reallocate if the extended BTB entry 300 is fully occupied. For instance, a branch entry of the branch entries 304(0)-304(B) that is associated with a corresponding merit counter 314(0)-314(B) having a lowest value may be selected to be reallocated, or a branch entry of the branch entries 304(0)-304(B) that is among one or more branch entries that each are associated with a corresponding merit counter 314(0)-314(B) having a value below a merit threshold 316 may be selected to be reallocated. The merit counters 314(0)-314(B) and the merit threshold 316 in some aspects may be incorporated into the extended BTB entry 300, or may be stored in a separate data structure (not shown) that is an element of or is external to the BTB circuit 134.

FIG. 4 illustrates an exemplary high-performance extended BTB entry that corresponds to each of the extended BTB entries 138(0)-138(E) of FIGS. 1 and 2 in some aspects. As seen in FIG. 4, an extended BTB entry 400 includes a tag 402 that identifies the extended BTB entry 400, and that may be generated based on an address of a corresponding aligned memory block such as the aligned memory blocks 204(0) and 204(1) of FIG. 2. The extended BTB entry 400 comprises a plurality of branch entries 404(0)-404(B) that each corresponds to a trunk branch instruction. The branch entries 404(0)-404(B) store trunk branch metadata for the corresponding trunk branch instruction. The trunk branch metadata (which corresponds to the trunk branch metadata 206 of FIG. 2) may include trunk branch offsets 406(0)-406(B) that indicate an offset of each corresponding trunk branch instruction from the address of the aligned memory block; trunk branch types 408(0)-408(B) that indicate a type of each corresponding trunk branch instruction; and trunk target addresses (captioned as "TRUNK TARGET ADDR" in FIG. 4) 410(0)-410(B) indicating a target address of each corresponding trunk branch instruction.

Additionally, each of the branch entries 404(0)-404(B) also stores one or more sets of leaf branch metadata for leaf branch instructions that correspond to the trunk branch instruction. The leaf branch metadata (which corresponds to the leaf branch metadata 208 of FIG. 2) may include leaf branch offsets 412(0,0)-412(0,L), 412(B,0)-412(B,L) that indicate an offset of each corresponding leaf branch instruction from the address of the aligned memory block from which the leaf branch instruction was fetched; leaf branch types 414(0,0)-414(0,L), 414(B,0)-414(B,L) that indicate a type of each corresponding leaf branch instruction; and leaf target addresses (captioned as "LEAF TARGET ADDR" in FIG. 4) 416(0,0)-416(0,L), 416(B,0)-416(B,L) indicating a target address of each corresponding leaf branch instruction.

Figure 5:
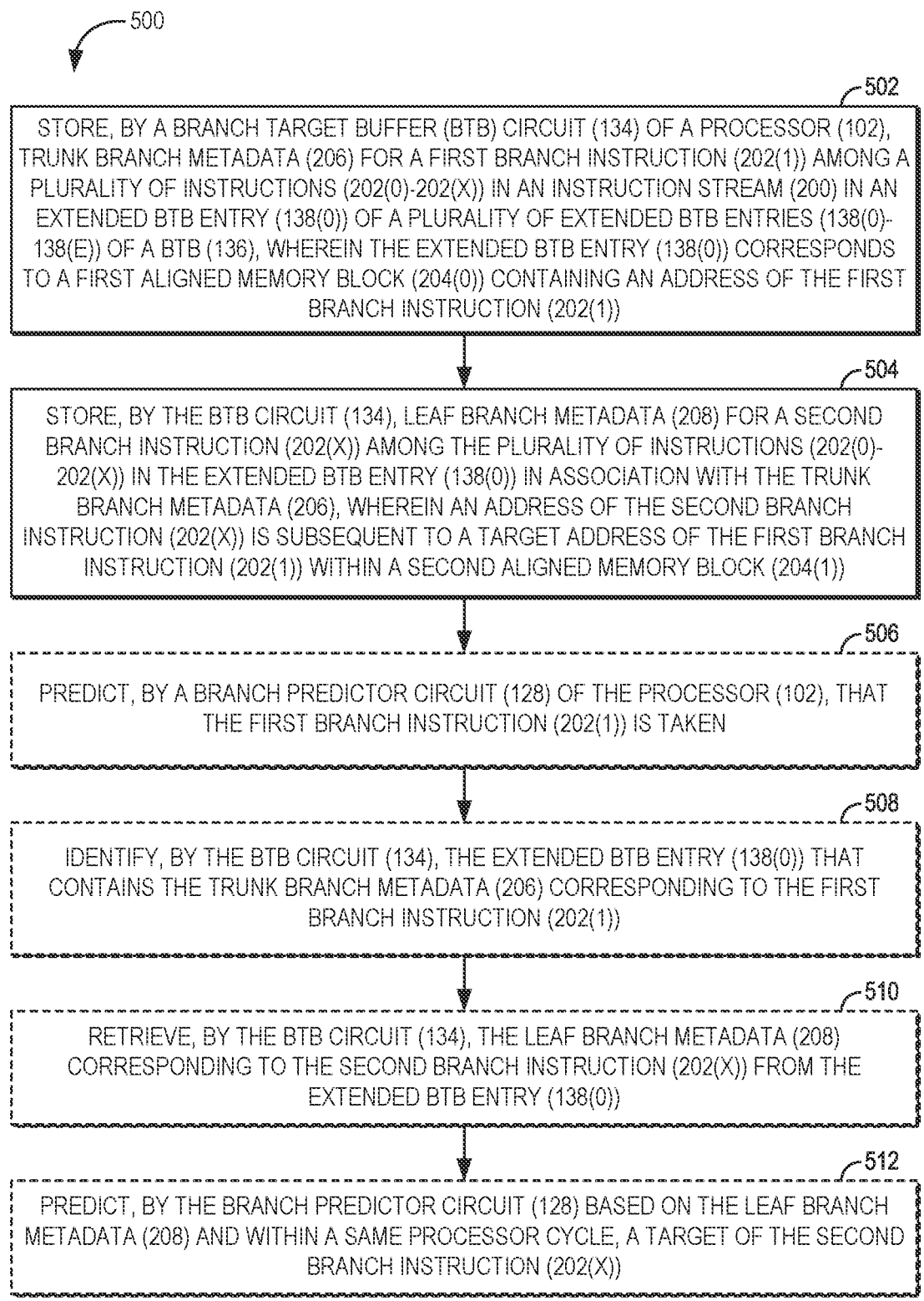
FIG. 5 is a flowchart illustrating exemplary operations performed by the BTB circuit and the branch predictor circuit of FIG. 1 for providing extended BTB entries for storing trunk branch metadata and leaf branch metadata.

FIG. 5 provides a flowchart 500 illustrating exemplary operations performed by the BTB circuit 134 and the branch predictor circuit 128 of FIG. 1 for providing extended BTB entries for storing trunk branch metadata and leaf branch metadata. For the sake of clarity, elements of FIGS. 1 and 2 are referenced in describing FIG. 5. Operations in FIG. 5 begin with a BTB circuit of a processor (e.g., the BTB circuit 134 of the processor 102 of FIG. 1) storing trunk branch metadata 206 for a first branch instruction (e.g., the branch instruction 202(1) of FIG. 2) among a plurality of instructions 202(0)-202(X) in an instruction stream 200 in an extended BTB entry (e.g., the extended BTB entry 138(0) of FIGS. 1 and 2) of a plurality of extended BTB entries 138(0)-138(E) of a BTB (such as the BTB 136 of FIG. 1), wherein the extended BTB entry 138(0) corresponds to a first aligned memory block (e.g., the first aligned memory block 204(0) of FIG. 2) containing an address of the first branch instruction 202(1) (block 502). The BTB circuit 134 also stores leaf branch metadata (e.g., the leaf branch metadata 208 of FIG. 2) for a second branch instruction (such as the branch instruction 202(X) of FIG. 2) among the plurality of instructions 202(0)-202(X) in the extended BTB entry 138(0) in association with the trunk branch metadata 206, wherein an address of the second branch instruction 202(X) is subsequent to a target address of the first branch instruction 202(1) within a second aligned memory block (e.g., the aligned memory block 204(1) of FIG. 2) (block 504).

In some aspects, the branch predictor circuit 128 of FIG. 1 predicts that the first branch instruction 202(1) is taken (block 506). The BTB circuit 134 identifies the extended BTB entry 138(0) that contains the trunk branch metadata 206 corresponding to the first branch instruction 202(1) (block 508). The BTB circuit 134 next retrieves the leaf branch metadata 208 corresponding to the second branch instruction 202(X) from the extended BTB entry 138(0) (block 510). The branch predictor circuit 128 then predicts, based on the leaf branch metadata 208 and within a same processor cycle, a target of the second branch instruction 202(X) (block 512).

Figure 6A:
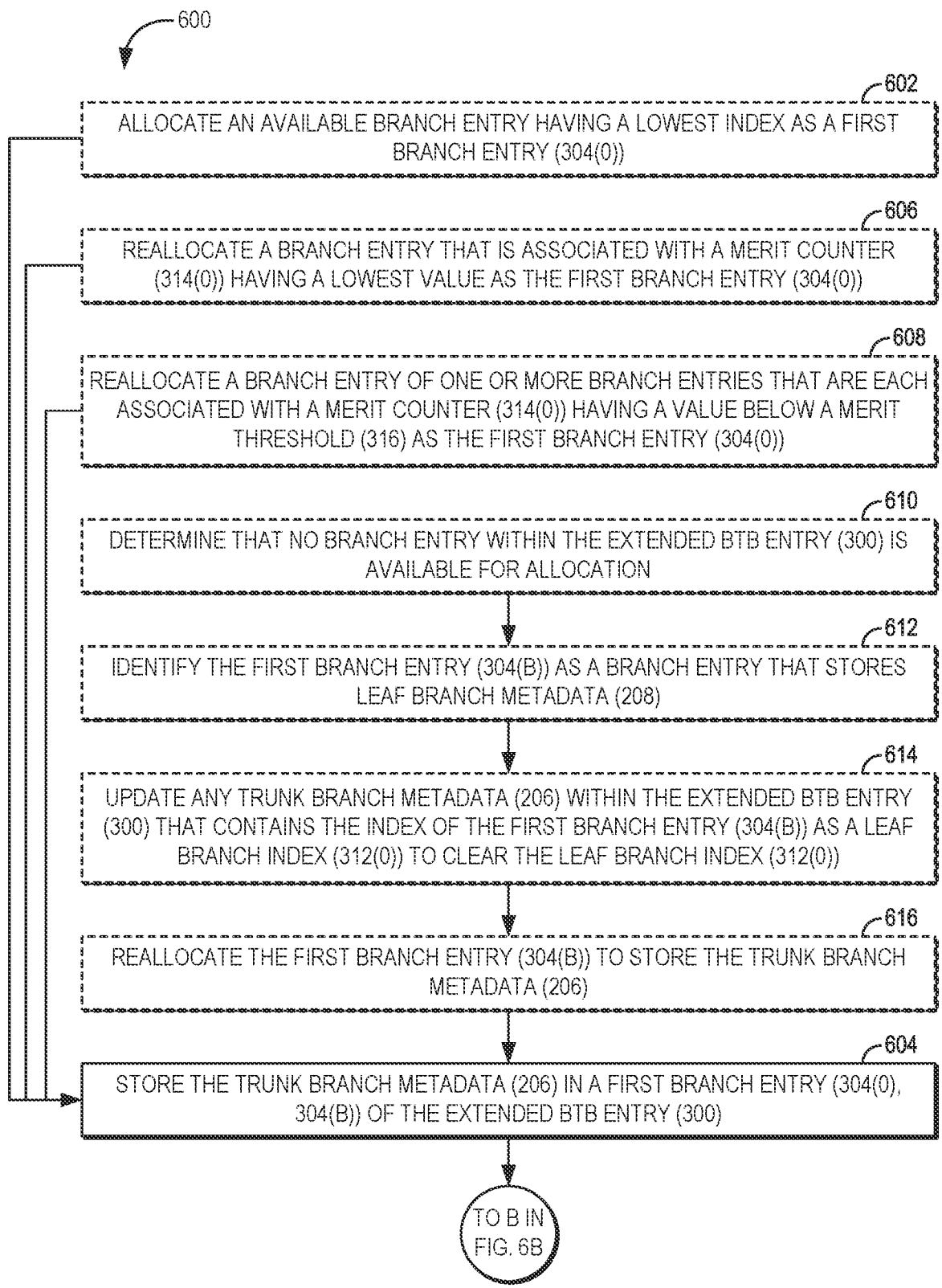
FIGS. 6A-6C are flowcharts illustrating exemplary operations for allocating branch entries in the hardware-efficient extended BTB entry of FIG. 3 according to some aspects.
Figure 6B:
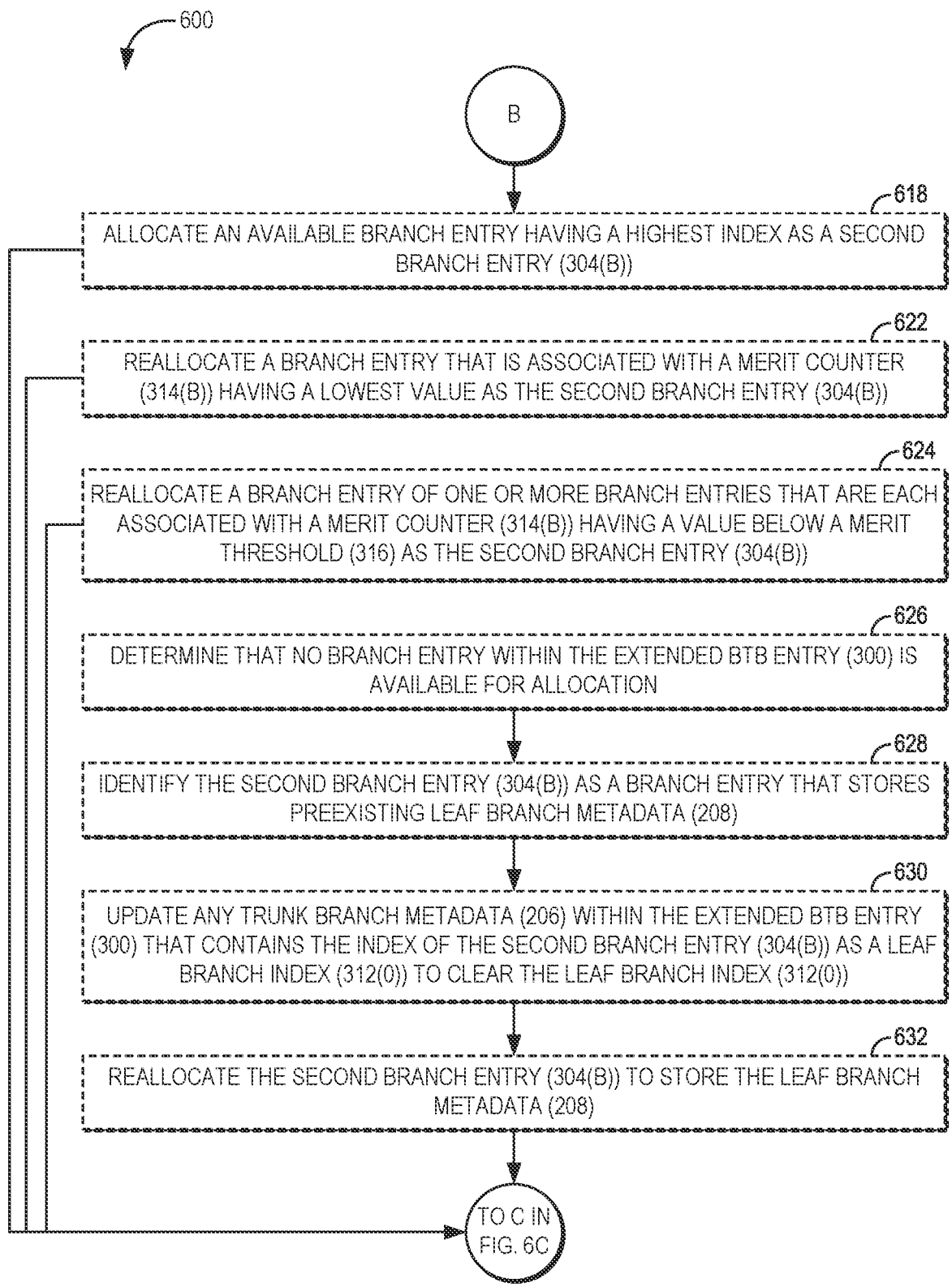
Figure 6C:
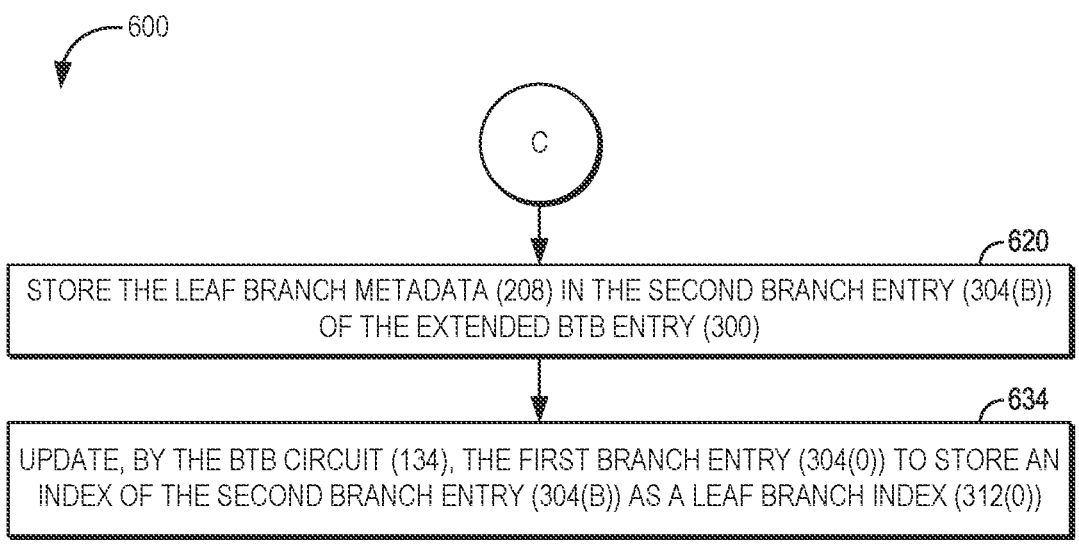

To illustrate exemplary operations for allocating branch entries in the hardware-efficient extended BTB entry 300 of FIG. 3 according to some aspects, FIGS. 6A-6C provide a flowchart 600. Elements of FIGS. 1-3 are referenced in describing FIGS. 6A-6C. It is to be understood that, in some aspects, some operations illustrated in FIGS. 6A-6C may be omitted when inapplicable for such aspects. In FIG. 6A, operations in some aspects begin with the BTB circuit 134 allocating an available branch entry (e.g., the branch entry 304(0) of FIG. 3) having a lowest index as a first branch entry 304(0) (block 602). Operations in such aspects may then continue at block 604 of FIG. 6A.

Some aspects may provide that the BTB circuit 134 reallocate a branch entry (e.g., the branch entry 304(0) of FIG. 3) that is associated with a merit counter having a lowest value (e.g., the merit counter 314(0) of FIG. 3) as the first branch entry 304(0) (block 606). Operations in such aspects may then continue at block 604 of FIG. 6A. According to some aspects, the BTB circuit 134 may reallocate a branch entry (e.g., the branch entry 304(0) of FIG. 3) of one or more branch entries that are each associated with a merit counter (e.g., the merit counter 314(0) of FIG. 3) having a value below a merit threshold (e.g., the merit threshold 316 of FIG. 3) as the first branch entry 304(0) (block 608). Operations in such aspects may then continue at block 604 of FIG. 6A.

In some aspects, the BTB circuit 134 may determine that no branch entry within the extended BTB entry 300 is available for allocation (block 610). The BTB circuit 134 identifies the first branch entry (e.g., the branch entry 304(B) of FIG. 3) as a branch entry that stores leaf branch metadata, such as the leaf branch metadata 208 of FIG. 2 (block 612). The BTB circuit 134 next updates any trunk branch metadata 206 within the extended BTB entry 300 that contains the index of the first branch entry 304(B) as a leaf branch index (e.g., the leaf branch index 312(0) of FIG. 3) to clear the leaf branch index 312(0) (block 614). The BTB circuit 134 then reallocates the first branch entry 304(B) to store trunk branch metadata, such as the trunk branch metadata 206 of FIG. 2 (block 616). Operations in such aspects then continue at block 604 of FIG. 6A.

With continuing reference to FIG. 6A, the BTB circuit 134 stores the trunk branch metadata 206 in the first branch entry (i.e., the branch entry 304(0) or the branch entry 304(B) of FIG. 3) of the extended BTB entry 300 (block 604). Operations in some aspects may continue at block 618 of FIG. 6B.

Referring now to FIG. 6B, the BTB circuit 134 in some aspects may allocate an available branch entry (e.g., the branch entry 304(B) of FIG. 3) having a highest index as a second branch entry 304(B) (block 618). Operations in such aspects may continue at block 620 of FIG. 6C. In some aspects, the BTB circuit 134 may reallocate a branch entry (e.g., the branch entry 304(B) of FIG. 3) that is associated with a merit counter (e.g., the merit counter 314(B) of FIG. 3) having a lowest value as the second branch entry 304(B) (block 622). Operations in such aspects may continue at block 620 of FIG. 6C. Some aspects may provide that the BTB circuit 134 reallocates a branch entry (e.g., the branch entry 304(B) of FIG. 3) of one or more branch entries that are each associated with a merit counter (e.g., the merit counter 314(B) of FIG. 3) having a value below a merit threshold (e.g., the merit threshold 316 of FIG. 3) as the second branch entry 304(B) (block 624). Operations in such aspects may continue at block 620 of FIG. 6C.

In some aspects, the BTB circuit 134 may determine that no branch entry within the extended BTB entry 300 is available for allocation (block 626). The BTB circuit 134 identifies the second branch entry 304(B) as a branch entry that stores preexisting leaf branch metadata 208 (block 628). The BTB circuit 134 next updates any trunk branch metadata 206 within the extended BTB entry 300 that contains the index of the second branch entry 304(B) as a leaf branch index (e.g., the leaf branch index 312(0) of FIG. 3) to clear the leaf branch index 312(0) (block 630). The BTB circuit 134 then reallocates the second branch entry 304(B) to store the leaf branch metadata 208 (block 632). Operations then continue at block 620 of FIG. 6C.

Turning now to FIG. 6C, the BTB circuit 134 stores the leaf branch metadata 208 in the second branch entry 304(B) of the extended BTB entry 300 (block 620). The BTB circuit 134 updates the first branch entry 304(0) to store an index of the second branch entry 304(B) as a leaf branch index 312(0) (block 634).

FIG. 7 provides a flowchart 700 to illustrate exemplary operations for allocating branch entries in the high-performance extended BTB entry 400 of FIG. 4 according to some aspects. Elements of FIGS. 1, 2, and 4 are referenced in describing FIG. 7 for the sake of clarity. In FIG. 7, operations begin with the BTB circuit 134 storing trunk branch metadata, such as the trunk branch metadata 206 of FIG. 2, in a first branch entry (e.g., the branch entry 404(0) of FIG. 4) of an extended BTB entry (e.g., the extended BTB entry 400 of FIG. 4) (block 702). The BTB circuit 134 also stores leaf branch metadata, such as the leaf branch metadata 208 of FIG. 2, in the first branch entry 404(0) of the extended BTB entry 400 (block 704).

FIG. 8 is a block diagram of an exemplary processor-based system 800 that includes a processor 802 (e.g., a microprocessor) that includes an instruction processing circuit 804 that comprises a BTB circuit (captioned "BTBC" in FIG. 8) 806 that corresponds in functionality to the BTB circuit 134 of FIG. 1. The instruction processing circuit 804 can be the instruction processing circuit 104 in the processor 102 in FIG. 1 as an example. The processor-based system 800 can be the processor-based system 100 in FIG. 1 as an example. The processor-based system 800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor 802 represents one or more general-purpose processing circuits, such as a microprocessor, central processing unit, or the like. The processor 802 is configured to execute processing logic in instructions for performing the operations and steps discussed herein. In this example, the processor 802 includes an instruction cache 808 for temporary, fast access memory storage of instructions accessible by the instruction processing circuit 804. Fetched or prefetched instructions from a memory, such as from the system memory 810 over a system bus 812, are stored in the instruction cache 808. The instruction processing circuit 804 is configured to process instructions fetched into the instruction cache 808 and process the instructions for execution.

The processor 802 and the system memory 810 are coupled to the system bus 812 and can intercouple peripheral devices included in the processor-based system 800. As is well known, the processor 802 communicates with these other devices by exchanging address, control, and data information over the system bus 812. For example, the processor 802 can communicate bus transaction requests to a memory controller 814 in the system memory 810 as an example of a slave device. Although not illustrated in FIG. 8, multiple system buses 812 could be provided, wherein each system bus constitutes a different fabric. In this example, the memory controller 814 is configured to provide memory access requests to a memory array 816 in the system memory 810. The memory array 816 is comprised of an array of storage bit cells for storing data. The system memory 810 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 812. As illustrated in FIG. 8, these devices can include the system memory 810, one or more input device(s) 818, one or more output device(s) 820, a modem 822, and one or more display controllers 824, as examples. The input device(s) 818 can include any type of input device, including but not limited to input keys, switches, voice processors, etc. The output device(s) 820 can include any type of output device, including but not limited to audio, video, other visual indicators, etc. The modem 822 can be any device configured to allow exchange of data to and from a network 826. The network 826 can be any type of network, including but not limited to a wired or wireless network, a private or public network, a local area network (LAN), a wireless local area network (WLAN), a wide area network (WAN), a BLUETOOTH™ network, and the Internet. The modem 822 can be configured to support any type of communications protocol desired. The processor 802 may also be configured to access the display controller(s) 824 over the system bus 812 to control information sent to one or more displays 828. The display(s) 828 can include any type of display, including but not limited to a cathode ray tube (CRT), a liquid crystal display (LCD), a plasma display, etc.

The processor-based system 800 in FIG. 8 may include a set of instructions 830 to be executed by the processor 802 for any application desired according to the instructions. The instructions 830 may be stored in the system memory 810, processor 802, and/or instruction cache 808 as examples of a non-transitory computer-readable medium 832. The instructions 830 may also reside, completely or at least partially, within the system memory 810 and/or within the processor 802 during their execution. The instructions 830 may further be transmitted or received over the network 826 via the modem 822, such that the network 826 includes the computer-readable medium 832.

While the computer-readable medium 832 is shown in an exemplary aspect to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the aspects disclosed herein. The term "computer-readable medium" shall accordingly be taken to include, but not be limited to, solid-state memories, optical medium, and magnetic medium.

The aspects disclosed herein include various steps. The steps of the aspects disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The aspects disclosed herein may be provided as a computer program product, or software, that may include a machine-readable medium (or computer-readable medium) having stored thereon instructions, which may be used to program a computer system (or other electronic devices) to perform a process according to the aspects disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the aspects described herein are not described with reference to any particular programming language. It will be appreciated that a variety of programming languages may be used to implement the teachings of the aspects as described herein.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present aspects.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed aspects incorporating the spirit and substance of the invention may occur to persons skilled in the art, the invention should be construed to include everything within the scope of the appended claims and their equivalents.

What is claimed is:

1. A processor, comprising:
an instruction processing circuit configured to process an instruction stream comprising a plurality of instructions in an instruction pipeline; and
a branch target buffer (BTB) circuit comprising a BTB comprising a plurality of extended BTB entries, wherein each extended BTB entry of the plurality of extended BTB entries comprises a plurality of branch entries each configured to store metadata comprising either trunk branch metadata or leaf branch metadata;
the BTB circuit configured to:
store trunk branch metadata for a first branch instruction among the plurality of instructions in a first branch entry of an extended BTB entry of the plurality of extended BTB entries, wherein the extended BTB entry corresponds to a first aligned memory block containing an address of the first branch instruction;
store leaf branch metadata for a second branch instruction among the plurality of instructions in a second branch entry of the extended BTB entry in association with the trunk branch metadata, wherein an address of the second branch instruction is subsequent to a target address of the first branch instruction within a second aligned memory block; and
update the first branch entry to store an index of the second branch entry as a leaf branch index.

2. The processor of claim 1, wherein:
the processor further comprises a branch predictor circuit;
the branch predictor circuit is configured to predict that the first branch instruction is taken;
the BTB circuit is further configured to:
identify the extended BTB entry that contains the trunk branch metadata corresponding to the first branch instruction; and
retrieve the leaf branch metadata corresponding to the second branch instruction from the extended BTB entry; and
the branch predictor circuit is further configured to predict, based on the leaf branch metadata corresponding to the second branch instruction and within a same processor cycle, a target of the second branch instruction.

3. The processor of claim 1, wherein the BTB circuit is further configured to:
allocate an available branch entry having a lowest index as the first branch entry; and
allocate an available branch entry having a highest index as the second branch entry.

4. The processor of claim 1, wherein the BTB circuit is further configured to, prior to storing the trunk branch metadata:
determine that no branch entry within the extended BTB entry is available for allocation;
identify the first branch entry as a branch entry that stores leaf branch metadata;
update any trunk branch metadata within the extended BTB entry that contains an index of the first branch entry as a leaf branch index to clear the index of the first branch entry; and
reallocate the first branch entry to store the trunk branch metadata.

5. The processor of claim 1, wherein the BTB circuit is further configured to:
determine that no branch entry within the extended BTB entry is available for allocation;
identify the second branch entry as a branch entry that stores preexisting leaf branch metadata;
update any trunk branch metadata within the extended BTB entry that contains the index of the second branch entry as a leaf branch index to clear the index of the second branch entry; and
reallocate the second branch entry to store the leaf branch metadata.

6. The processor of claim 1, wherein:
each branch entry of the plurality of branch entries is associated with a corresponding merit counter of a plurality of merit counters; and
the BTB circuit is further configured to reallocate a branch entry that is associated with a merit counter having a lowest value as one of the first branch entry or the second branch entry.

7. The processor of claim 1, wherein:
each branch entry of the plurality of branch entries is associated with a corresponding merit counter of a plurality of merit counters; and
the BTB circuit is further configured to reallocate a branch entry of one or more branch entries that are each associated with a merit counter having a value below a merit threshold as one of the first branch entry or the second branch entry.

8. A method, comprising:
storing, by a branch target buffer (BTB) circuit of a processor, trunk branch metadata for a first branch instruction among a plurality of instructions in an instruction stream in a first branch entry of a plurality of branch entries of an extended BTB entry of a plurality of extended BTB entries of a BTB, wherein:
the extended BTB entry corresponds to a first aligned memory block containing an address of the first branch instruction; and
the plurality of branch entries are each configured to store metadata comprising either trunk branch metadata or leaf branch metadata;
storing, by the BTB circuit, leaf branch metadata for a second branch instruction among the plurality of instructions in a second branch entry of the plurality of branch entries of the extended BTB entry in association with the trunk branch metadata, wherein an address of the second branch instruction is subsequent to a target address of the first branch instruction within a second aligned memory block; and
updating, by the BTB circuit, the first branch entry to store an index of the second branch entry as a leaf branch index.

9. The method of claim 8, further comprising:
predicting, by a branch predictor circuit of the processor, that the first branch instruction is taken;
identifying, by the BTB circuit, the extended BTB entry that contains the trunk branch metadata corresponding to the first branch instruction;
retrieving, by the BTB circuit, the leaf branch metadata corresponding to the second branch instruction from the extended BTB entry; and
predicting, by the branch predictor circuit based on the leaf branch metadata corresponding to the second branch instruction and within a same processor cycle, a target of the second branch instruction.

10. The method of claim 8, further comprising:
allocating an available branch entry having a lowest index as the first branch entry; and
allocating an available branch entry having a highest index as the second branch entry.

11. The method of claim 8, further comprising, prior to storing the trunk branch metadata:
- determining that no branch entry within the extended BTB entry is available for allocation;
- identifying the first branch entry as a branch entry that stores leaf branch metadata;
- updating any trunk branch metadata within the extended BTB entry that contains an index of the first branch entry as a leaf branch index to clear the index of the first branch entry; and
- reallocating the first branch entry to store the trunk branch metadata.

12. The method of claim 8, further comprising:
- determining that no branch entry within the extended BTB entry is available for allocation;
- identifying the second branch entry as a branch entry that stores preexisting leaf branch metadata;
- updating any trunk branch metadata within the extended BTB entry that contains the index of the second branch entry as a leaf branch index to clear the index of the second branch entry; and
- reallocating the second branch entry to store the leaf branch metadata.

13. The method of claim 8, wherein:
- each branch entry of the plurality of branch entries is associated with a corresponding merit counter of a plurality of merit counters; and
- the method further comprises reallocating a branch entry that is associated with a merit counter having a lowest value as one of the first branch entry or the second branch entry.

14. The method of claim 8, wherein:
- each branch entry of the plurality of branch entries is associated with a corresponding merit counter of a plurality of merit counters; and
- the method further comprises reallocating a branch entry of one or more branch entries that are each associated with a merit counter having a value below a merit threshold as one of the first branch entry or the second branch entry.

15. A non-transitory computer-readable medium having stored thereon computer-executable instructions that, when executed, cause a processor to:
- store trunk branch metadata for a first branch instruction among a plurality of instructions in an instruction stream in a first branch entry of a plurality of branch entries of an extended branch target buffer (BTB) entry of a plurality of extended BTB entries of a BTB, wherein:
  - the extended BTB entry corresponds to a first aligned memory block containing an address of the first branch instruction; and
  - the plurality of branch entries are each configured to store metadata comprising either trunk branch metadata or leaf branch metadata;
- store leaf branch metadata for a second branch instruction among the plurality of instructions in a second branch entry of the plurality of branch entries of the extended BTB entry in association with the trunk branch metadata, wherein an address of the second branch instruction is subsequent to a target address of the first branch instruction within a second aligned memory block; and
- update the first branch entry to store an index of the second branch entry as a index.

16. The non-transitory computer-readable medium of claim 15, wherein the computer-executable instructions further cause the processor to:
- predict that the first branch instruction is taken;
- identify the extended BTB entry that contains the trunk branch metadata corresponding to the first branch instruction;
- retrieve the leaf branch metadata corresponding to the second branch instruction from the extended BTB entry; and
- predict, based on the leaf branch metadata corresponding to the second branch instruction and within a same processor cycle, a target of the second branch instruction.

* * * * *